Patented May 5, 1953

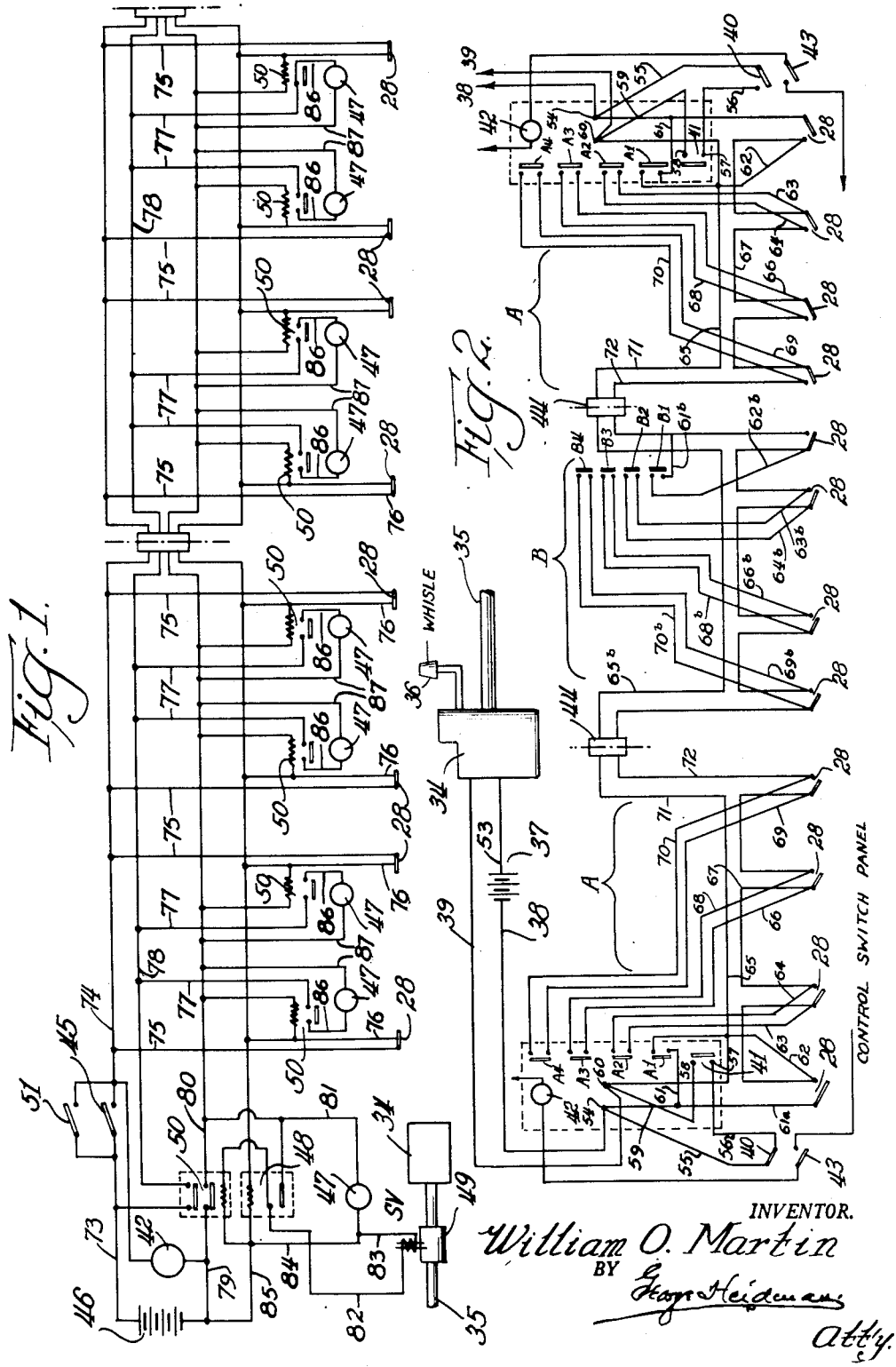

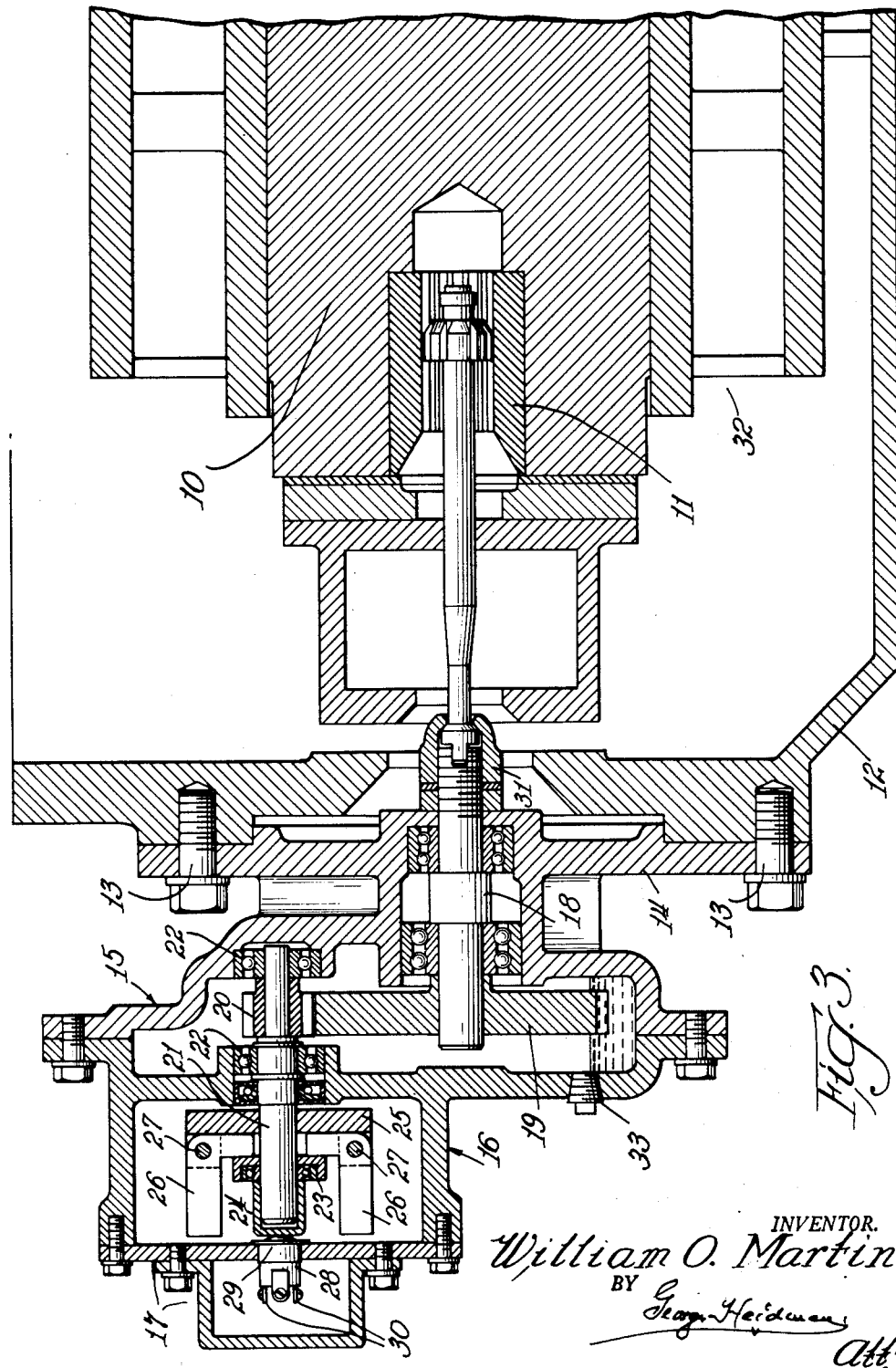

2,637,806

UNITED STATES PATENT OFFICE 2,637,806

WHEEL SLIDE INDICATOR AND CONTROL MECHANISM FOR DIESEL AND ELECTRIC LOCOMOTIVES

William O. Martin, Fort Smith, Ark.

Application November 9, 1950, Serial No. 194,812

7 Claims. (Cl. 246—169)

My invention is more especially intended for use in connection with diesel or electric driven locomotives and has for its object the provision of means whereby failure of the armature shaft bearings on the traction motors—which latter are geared to the locomotive power or drive wheels—causes the armature shaft to cease operation, which in turn, causes the corresponding locomotive power wheels to slide on the rails.

As a result of the condition mentioned, the sliding wheels create a "false flange" on the rails and flat spots on the wheels which, when they come in contact with switch points, frogs, and the like, ordinarily will cause derailment.

A purpose of my invention is, that in the event any pair of wheels on an electric or diesel locomotive should slide for any cause, an indication should be given to the engineer—such as a light, a bell or whistle—and in addition, if the locomotive speed is not reduced to a predetermined speed within a predetermined period of time after the slide indication has been given, my improved mechanism will automatically apply the brakes on the locomotive and train, if coupled in a train, and will keep the brakes applied until the speed has been reduced to the predetermined speed; and will reapply the brakes if the speed of the locomotive again gets above the predetermined speed and a pair of the locomotive wheels are sliding from any cause.

The objects and advantages of my invention will be readily comprehended from the following detailed description of the accompanying drawings wherein:

Figure 1 is a diagrammatic illustration of an open electric circuit for carrying out my invention.

Figure 2 is a diagrammatic illustration of a closed type of electric circuit also adapted to carry out the invention.

Figure 3 is a transverse sectional view of the mechanical mechanism employed operatively intermediate either one of the electrical circuits shown in Figures 1 and 2 and a journal of a drive wheel of the diesel or electric driven locomotive.

My invention as exemplified in the drawings is designed for use on diesel and electric locomotive units and more especially locomotives equipped with Westinghouse Air Brake Company's 24RL air brake equipment, which is the standard equipment on electric and diesel locomotives, well-known and needing no description. That is to say, my invention is especially designed for use on diesel and electric locomotives and provided with a well-known type of controlled application air line whereby the automatic air brake application is controlled.

Furthermore, as all electric and pneumatic switches per se used in my invention are of standard manufacture and well-known in the electrical art, detail description thereof is not believed necessary, except insofar as their uses or functions in connection with my invention are thought advisable.

Detail description of the Westinghouse No. 24RL Brake Equipment is set forth in the "Instruction Pamphlet No. 5066-5" published by the Westinghouse Air Brake Company, December 1946, which also describes and illustrates the FA-4 Magnet valve, hereinafter referred to, page 11 and plate B.

I shall first describe the mechanical means of my improved mechanism as disclosed in Figure 3 wherein a portion of the journal or axle of a drive wheel of the locomotive is shown; it being understood that the axle of each locomotive drive wheel is similarly constructed and arranged.

The axle 10 at its end is bored and a spline bushing 11 pressed therein and the end of the axle or journal 10 provided with a suitable journal box housing 12 to which my improved adaptor means may be secured and held in place as shown for example by the bolts or cap screws 13 which extend through the rear wall 14 of the adaptor housing 15, to which a governor housing 16, provided with a switch plate 17, is secured.

The adaptor 15 contains a drive shaft 18 provided with a drive gear 19, which meshes with a gear 20 secured to a governor shaft 21, which has suitable bearings at 22, 22; a thrust bearing 23 for the inner end of a switch plunger 24.

Disposed about the governor shaft 21, and suitably secured thereto, is a governor yoke 25, to which the governor weights 26 are secured by means of the pins 27; the switch plunger 24 being actuated by the governor through the medium of the thrust bearing 23, thereby controlling certain of the electrical circuits, disclosed in either Figure 1 or 2, through operation of a control switch at 28 provided with a switch spring at 29 and electrical wire attaching contacts at 30.

The spline drive shaft connection with main drive shaft 18 is retained by a suitable nut as at 31; and the journal 10 in the housing 12 is, of course, provided with suitable bearings at 32; while the adaptor housing 15 is provided with an oil level filler plug 33.

All applications of my improved mechanism will be defined as applied to a locomotive unit or units equipped with Westinghouse Air Brake Company's 24RL air brake equipment having basic locomotive brake equipment, all of which is standard equipment on electric and diesel locomotives.

It is desirable in certain instances to have a normally "closed" circuit and in other cases to employ a normally "open" circuit. Considering the mechanism in connection with the normally closed circuit, it will be understood that the electric circuit of the locomotive is electrically connected with the mechanically controlled switch 28 at the ends of the journals 19 of each pair of locomotive drive or power wheels (not shown).

The closed circuit, as diagrammatically illustrated in Figure 2, involves a suitable solenoid or magnet valve at 34 connected with the application air line or pipe 35 and a suitable exhaust or whistle at 36. Connected with valve 34 is the circuit of my improved mechanism which involves a suitable source of electrical energy or battery 37, leads 38, 39 connected in series with magnet valve 34; lead or line 38 being connected with master switch 40 which closes the circuit to a master test switch 41 which in turn completes the circuit through lead or wire 39. This circuit also involves the mechanically operated journal switches disclosed in Figure 3 and indicated at 28, which switches normally are open while the locomotive is standing or operating below a predetermined speed; the circuit passing through master test switch 41 to the solenoid or magnet valve 34. Under normal conditions, switch 40 is closed while the journal switches 28 are open. The circuit also involves suitable signal providing means such as a light indicated at 42 when the governor controlled or journal switch 28 is closed.

The master switch 40 operates at a higher speed than that at which the journal switch 28 closes; and the journal switch closes at a lower speed than that at which signal switch 43 operates.

As electric and diesel locomotives frequently consist of more than one unit, the diagrammatic illustration of the electric circuit is shown, for example, applied to three units indicated as A—B—A, and the mechanical or journal switches all indicated as 28. The units are each provided with substantially the same circuits as heretofore described; and the circuits of each unit also are provided with a plurality of push-button test switches at A1—2—3 and 4 and at B1—2—3 and 4. These push-button switches enable the engineer to cut out a governor or journal switch in the respective unit in the event of spline breakage or other difficulty and enable the engineer to determine or locate the point of difficulty and also to cut out the governor controlled switches for the purpose of making pre-departure tests while the engine is at a stand-still.

The master test switch 41 is preferably a push-button type, for opening the master switch circuit in order to make standing pre-departure tests.

The circuit also may be provided with knife switches connected in parallel with the journal or governor controlled switches if it is desired to cut out any pair of wheels in the event the flexible wires of contacts 30 should become broken.

When in operation and the driven or governor shaft 21 is rotating at sufficient speed, the governor weights 26, 26 will swing radially outward until the pressure on the plunger switch 24 overcomes the tension in the control switch spring 29 and closes the contact points at 30 in the closed circuit of Figure 2 (or opens the contact points in an open circuit as in Figure 1), namely, if the contacts normally are open or closed. As the speed of the locomotive increases, the journal switch spring 29 (having less tension than that of control switch 40), the latter or journal switch will close before control switch 40, thereby opening the control circuit and closing the circuit to the signal indicator light 42—control switch 40 being a two-way switch.

If, at or above a predetermined speed, a pair of wheels, the journal whereof is provided with my improved mechanism, should—for any cause—start sliding, the switch spring 29 in that particular journal or governor switch would open the contacts (as the journal would not be rotating when its wheels are sliding) and break the circuit to the magnet valve at 34 and induce the air in application pipe 35 to vent to atmosphere—sounding the alarm or whistle 36—thereby reducing the air pressure and cause brake application. In other words, whenever the circuit of the normally energized magnet valve 34 is de-energized, a signal alarm is given and the brakes automatically become applied.

While the locomotive equipped with my improved mechanism is standing, the journal switches will be open, as is the case with a wheel sliding when the locomotive is moving, and the circuit to the magnet valve 34 will become de-energized and cause brake application and to so remain except that my invention provides for a continuous unbroken circuit by having the master switch 40 "closed" when the locomotive is standing and thus completing and retaining an energized circuit.

In the event a pair of wheels should be sliding and it is desired to side-track the locomotive, this can be done—but not at a hazardous speed; my invention making this possible by having less spring tension on the journal switches than on the spring of the master switch 40. As long as the locomotive journal speed does not exceed the speed to which the master switch is set, the locomotive may be moved.

When the locomotive is in the shop, station or standing, tests of the circuit of my mechanism may be made by reason of test switch 41 (which is normally closed) and the test switches A1, A2, A3, A4 (which normally are open) and/or test switches B1, B2, B3 and B4. All of these test switches are connected in parallel with switches 40 and the journal switches 28; and it will be understood that anything that de-energizes the circuit to the solenoid or magnet valve 34 will cause the valve 34 to operate, give an alarm and induce air brake application. When the locomotive is standing still all switches 28 are open, breaking the circuit at the various wheel journals, while the circuit to the magnet valve 34 is not broken as it is completed through the closed master switch 40. In testing the circuit, therefore, while the locomotive is standing, test switches A1 to A4, and/or B1 to B4, are closed—which simulate the journal switches 28 when closed due to the locomotive running above a predetermined speed, and test switch 41 is opened, which simulates the master switch 40 being open when the speed of the locomotive is above a predetermined speed.

If none of the wires or connections in the circuit are broken, then nothing will happen, but if any wires or connections are broken or loose, then magnet valve 34 will operate, give a signal and automatically apply the air brakes.

In the event a truck or a pair of drive wheels is to be changed on a locomotive unit equipped with my improved automatic wheel slide indicator and control mechanism, and to be replaced with truck or pair of wheels also equipped, it merely is necessary to remove the cover plate from the unit housing on each journal bearing box, as the cover plates contain the control switches; the cover plate being interchangeable and it is unnecessary to disconnect any of the wires.

The circuits between the respective locomotive units are shown provided with short-circuiting connectors as at 44.

In making application of my improved wheel slide indicator and control mechanism to a locomotive unit, it is isolated from and independent of other equipment on the locomotive.

Electrical energy is obtained direct from the storage battery of the locomotive unit, or in the case of electric locomotives from a transformer. If the locomotive consists of more than one unit, then the circuits are made continuous by the use of "jumpers" between each unit, similar to those now used with electro-pneumatic brakes.

When an open circuit, as disclosed, for example in Figure 1, is used and in operation, after the speed of the locomotive reaches a predetermined speed, the master switch 45 which obtains its electrical energy direct from the storage battery 46, is closed; electrical energy is then available at the control or journal switch 28 on each pair of powered wheels. If all wheels are turning then the control switches (which are governor controlled as shown in Figure 3) on each pair of powered wheels are open and this will be indicated by the center or "master switch" light 42, showing a "green" light at all times while the speed is at or above the predetermined speed.

Should a pair of powered wheels start sliding for any cause, at or above the predetermined speed, then, in addition to the green light on the indicator panel, a red light 47 will show in the locomotive unit having a pair of sliding wheels, as well as in the truck in which they are located, while at the same time, an alarm will sound in the A unit of the locomotive.

If the speed of the locomotive is not reduced below the predetermined speed within a predetermined length of time, the time delay and relay switch at 48 being energized will operate the air operated solenoid valve 49, which, when energized, automatically applies the brakes by exhausting air from application pipe 35 and brake application will maintain until the speed has been reduced below the predetermined speed adjustment of the master switch.

The purpose of applicant's improved mechanism is to prevent locomotive operation above a predetermined speed when a powered wheel is sliding from any cause, therefore, if a brake application to reduce speed is made, due to high brake cylinder pressure, or a bad rail, my mechanism also will apply the brakes if a powered wheel is slipping and is under the predetermined speed adjustment. To overcome this, if the wheel slippage or sliding is due to brake application, the locomotive brakes should be released until all wheels are again turning, at which time my mechanism will permit the engine man to have full control of the brakes provided the wheel or wheels are again revolving before the time relay switch 48 cuts in.

With the open circuit of Figure 1, the mechanically operated or journal switches 28 normally are closed as shown and are mounted in suitable housings secured to the journal bearing boxes.

All powered wheel control units are electrically connected to a signal indicator light, and in addition are provided with a manual reset relay switch 50 to the indicator light on each B unit. There is also located in each A unit a manually reset relay switch that causes the indicator light to remain lit in the unit in which a wheel slide indication was given until the manually reset switch has been returned to normal "manually" as follows: When a powered wheel on any unit begins sliding or slipping after a brake application, the signal will be given in the A unit. If it is on the leading A unit, the signal indicator will so indicate; if it is on a B unit or the trailing A unit, only an alarm signal will be given in the leading A unit. If it is suspected that the wheel is sliding due to a brake application, the independent brake valve should be immediately suppressed. If the pair of sliding wheels do not begin to revolve again by the time the time delay relay switch 48 operates, the brake applicator valve will then function and the brakes on the train will then be applied. In addition the trip relay 50 on the A unit will operate energizing the circuit direct from the battery 46 instead of through the master switch 45 on the A unit. This will then cause the trip relay 50 to function in the unit in which the pair of wheels is sliding and will also denote the truck in which the pair of wheels is located.

In order to locate the unit in which the wheel is sliding, it will be necessary for some member of the crew, after the train has stopped, to pass through the units until the one in which the wheel is sliding is located. After its location, the trip relay 50 in the A unit must be manually reset for "operations," and then the one in the affected unit manually reset. After this has been done, the defective unit may be set out, or the train cleared of the main track, provided the speed does not exceed the adjustment of the master switch 45 in the A unit.

To test applicant's improved mechanism at the shops, terminals, or any time the locomotive is standing still, a simple "test switch" 51 is provided. In making a test simply close the test switch until the brake applicator valve applies brakes. Then all lights should show, the switch 50 in A unit should operate and lock, and all trip relay switches 50 and lights in all units should be locked and lighted. Should any light fail to light while test switch 51 is closed, it would indicate:

1. A defective light bulb
2. A loose connection or broken wire
3. A defective control switch It should be remembered, any light that fails to light up when test switch 51 is closed, gives the same indication as to where the trouble is that would be given if a pair of wheels were sliding. In other words, for illustration, if the light to front pair wheels in the front trucks does not light up when the test switch 51 is closed, that would indicate a defective bulb, loose connection or broken wire, or defective control switch, to the front pair of wheels in the front truck, etc.

If, while running at or above the predetermined speed adjustment of the master switch 45, a wheel slide indication is given and it is found that the wheel is not sliding, that would indicate that the spline drive shaft, Figure 3, at the pair of wheels that were shown as "sliding" is broken or disconnected, or there is a ground or short in the wires between the indicator lights and control switch to the pair of wheels shown "sliding." To remedy and avoid unnecessary delay, open the switch to that line at the indicator box to the unit on the pair of wheels where the defect is found and proceed. You then, of course, would not get a wheel slide indication and control, should that pair of wheels actually slide, until the defect is remedied.

Should a wheel slide indication be given, and the brakes do not automatically apply and speed is above the predetermined speed adjustment of the master switch, that would indicate a defect in the wiring to/or in the time delay switch or to the air operated solenoid valve. In that event, the engineer would know a pair of wheels were sliding and would also know which pair of wheels it is and in which truck they are located. He then must stop the train and proceed only as he would if the automatic brake applicator were operative.

It should be remembered, the heart of applicant's wheel slide indicator and control mechanism is the "master switch," the indicator light whereof should be lit at all times when the speed is above 5 M. P. H. If the master switch is operated off the end of an idler wheel axle and the green light should go out, it would indicate the idler wheel was sliding, or the drive shaft or master switch was defective. The train should be stopped immediately and the cause ascertained and if the idler wheel is not sliding, it would indicate a broken drive shaft, wire, or defective master switch. In that event, the test switch 51 should be "closed" while running and opened when speed has decelerated to 5 M. P. H. or less. This will then energize the circuits to the control switches 28 on the powered wheels and enable the device to indicate a powered wheel sliding but it will not release the brakes until the test switch is "opened."

The difference in the diameter of the wheels does not effect the operation of applicant's improved wheel slide indicator and control, nor does it matter on which side of the engine the master switch and control units are applied, nor is it necessary to have them all on the same side.

The circuits will now be more specifically traced and in keeping with the order of the previous description, the closed type of electric circuit disclosed in Figure 2 will be traced and then the electric circuit of Figure 1.

In Figure 2 the solenoid or magnet valve 34, by means of conductor or lead 53, is connected with the battery 37, which has lead line or conductor 38, which connects with terminal 54, conductor 55, to one end of normally closed master switch 40 which also has a conductor 56 that leads to terminals 57 of master test switch 41, while the opposite terminal 58, through conductor 59, terminal 60, is connected to conductor 39 which extends to magnet valve 34; the circuit to master test switch 41 being established when master switch 40 is closed. This circuit also involves the push button circuits of the various governor controlled switches 28; push button test switch A1 has one terminal connected with conductor 61, which through the medium of terminal 54, is connected to conductor 38 from battery 37, conductor 38, through the medium of conductor 61a, is connected with a terminal of the first governor controlled switch 28 from the left Figure 2, whose other contact has conductor 62 which leads through terminal 60 to conductor 39.

Push button test switch A2 has one of its contacts connected by conductor 63 with one contact of the second from the left governor controlled switch 28, while the other contact of this switch has conductor 64 connected with the other contact of switch A2. The first mentioned contact of this switch 28 also has lead 65 connected with conductor 62.

Push button test switch A3 has one contact connected by conductor 66 with one of the contacts of the third from the left governor controlled switch 28, which contact is also connected by conductor 67 with a contact of the previously mentioned switch 28. The other contact of push button switch A3 connects with the other contact of the last switch 28 by means of conductor 68.

Push button switch A4 has one of its contacts connected by conductor 69 with a terminal of the fourth from the left governor controlled switch 28, whose other contact is connected by conductor 70 with the second contact of push button switch A4.

The circuits between the locomotive units are established through the connectors 44; one side of the connector 44, between A and B units being connected by conductor 71 with conductor 65 and by conductor 72 with a contact of the last mentioned plunger switch 28 of unit A. The unit B has similar push button switches as those in unit A, at B1, B2, B3, and B4, connected with their respective plunger switches 28, by means of conductors 69B, 70B—66B, 68B—63B, 64B, 61B, 65B, the latter being connected with connector 44 between B unit and the second A unit, whose circuits are substantially the same as those of the first A unit and hence may be similarly identified but need no specific description.

The open electric circuit of Figure 1 will now be traced. The master switch 45 is connected by conductor 73 with battery 46. The other contact of switch 45 is provided with a conductor 74, from which extends conductor 75, leading to a contact of closed journal switch 28. The other contact of this switch 28 has a conductor 76, to which manual reset relay switch 50 is connected said switch also being connected by conductor 77 with conductor 78. The master switch or green light 42 is connected to conductor 74 and to the opposite terminal of battery 46 by means of leads 79; the lead 79 also extending to a contact of manual reset relay switch 50; the opposite contact having a conductor 80 from which a lead 81 extends to the red light 47; lead 81 also having relay switch 48 connected therewith. Time delay relay switch 48 is connected through lead 82, with one end of the winding of solenoid valve 49, while the opposite end of the winding, by means of lead 83, is connected with red light 47, which, by means of lead 84, conductor 85, is connected with battery 46.

The second red light 47 is connected with a contact of manual reset relay switch 50 by lead 86; the opposite contact of switch 50 being connected by conductor 77 with conductor 78; while the opposite side of each red light 47 is connected with conductor 80 through leads 87.

I have described what I believe to be the best embodiment of my invention and methods of adaptation, but certain modifications are possible and may be made without, however, departing from the spirit of my invention as defined in the appended claims.

What I claim is:

1. In combination with the air brake application pipe with air brakes and a magnet valve in the air brake application pipe and the powered wheel axles of the locomotive, control mechanism associated with the journal of each powered wheel and comprising a drive shaft operatively connected with the journal of a power wheel of the locomotive; a driven shaft operatively associated with said drive shaft to rotate at a speed correlated to the speed of the powered wheel journal; a governor controlled electric switch associated with an end of said driven shaft and operable when the wheel journal rotates at or above a preselected speed; and an electric circuit provided with a master switch, electrically connected with said magnet valve and said governor controlled switch with an indication light effective when the master switch is closed, whereby said magnet valve is affected when the governor switch has been actuated, pressure in said air application pipe reduced and air brake application made when wheel slide due to non-rotation of the powered wheel journal occurs.

2. In a wheel slide indicating and control mechanism for diesel and electric locomotives provided with motor driven wheels whose journals are rotatably mounted in housings provided with removable cover plates, and application air pipe for controlling the air brakes, the combination of a shaft rotatably mounted on each housing cover plate and splined to the journal of each of the driven wheels; a second shaft rotatably mounted in each cover plate, driven by said first mentioned shaft and provided with a speed controlled governor switch; a magnet switch arranged in said air pipe for affecting the air pressure in said air pipe and providing a signal; an electric circuit, involving a source of electrical energy, arranged between said magnet switch and said speed controlled governor switch and provided with a master switch, whereby the speed controlled switch is actuated when the locomotive speed is at or above a predetermined speed and a locomotive drive wheel is sliding, a signal indication provided and air brake application made.

3. Wheel slide indicating and control mechanism for diesel and electric locomotives having motor driven wheeled axles and an application air line for controlling the air brakes; comprising a shaft splined to an axle of a powered wheel and provided with a gear; a second shaft provided with a gear arranged in mesh with the first mentioned gear and adapted to rotate at a speed commensurate with the wheeled axle speed; a speed controlled governor operatively associated with said second shaft; a plunger electric switch slidable on said second shaft normally in open position and controlled by said governor; a solenoid valve in said air line for reducing the air pressure in said line and to provide an indication; an electric circuit intermediate said plunger switch and said solenoid valve, said circuit involving a master switch, and indicator lamp and a source of electrical energy, whereby air is vented from said air line, an indication provided and brake application made when the locomotive is traveling at or above a predetermined speed with a non-rotating axle and sliding wheel.

4. In a wheel slide indicating and control mechanism for locomotives having motors operatively connected with the axles of the drive wheels of the locomotive and provided with an air line and automatically controlled air brakes, a magnet valve in the air line; control and indicating mechanism comprising a spring controlled mechanically operated plunger switch operatively associated with the journal of each pair of locomotive drive wheels adapted to be actuated when the locomotive travels at or above a predetermined speed; an electric circuit involving said magnet valve, said journal switches, a master switch and signal indicating means; a source of electrical energy for said circuit; manually controlled test switches arranged in parallel with said master switch and said mechanically operated journal switches for individual testing of the circuit through each journal switch whereby said magnet valve will be operated, give a signal and effect brake application while the locomotive is standing.

5. Wheel slide indicating and control mechanism for diesel and electric locomotives provided with a control air line, a magnet valve in said line and automatically controlled air brakes; in combination with an electric circuit adapted to actuate said valve and provided with a double-acting master switch and signal providing means; a stub shaft splined to the journal of each pair of locomotive power wheels; a driven shaft actuated by said stub shaft at a speed correlated to the journal speed and provided with a plunger switch adapted to effect the circuit of said magnet valve when the locomotive speed exceeds the speed adjustment of said master switch whereby said valve will be operated, pressure in said air line reduced and air brake application provided.

6. In combination with the application air line of a diesel and electric locomotive having valve means for reducing air pressure in said line to induce air brake application, wheel slide indicating and control mechanism comprising an electric circuit with a source of electric energy and a master switch; a plurality of speed controlled governor operated switches, associated with the journals of each pair of powered wheels of the locomotive, arranged to operate and effect the electric circuit to said valve means when the locomotive speed is at or above a predetermined speed; indicator and warning means arranged in the circuit and operative when one of said governor operated switches is actuated, said means being arranged to indicate the particular pair of sliding wheels; a time delay and relay switch operatively intermediate a governor operated journal switch and said air line valve means whereby the latter will be operated if the locomotive speed is not reduced below said predetermined speed in a predetermined period of time and brake application made.

7. Wheel slide indicator and control means for diesel and electric locomotives comprising an electric circuit for indicating the working condition of a respective drive wheel, the journal box end of each drive wheel being provided with a journal box housing, adaptor means removably secured to said housing and involving a shaft operatively connected to the drive wheel journal so as to rotate therewith, a governor shaft means intermediate said adaptor shaft and governor shaft whereby the latter revolves at a speed commensurate with the speed of said shaft, and a spring-controlled plunger slidably mounted on said governor shaft and adapted to be forced outwardly by the governor; a switch carrying plate removably secured at the outer end of said plunger, said switch being arranged to be affected by said plunger to actuate means whereby the condition of the respective drive wheel is indicated.

WILLIAM O. MARTIN.

References Cited in the file of this patent

UNITED STATES PATENTS

| Number | Name | Date |
| --- | --- | --- |
| 2,232,751 | Wilson | Feb. 25, 1941 |
| 2,232,752 | Wilson | Feb. 25, 1941 |
| 2,438,394 | Hines | Mar. 23, 1948 |